United States Patent [19]

Petranto

[11] Patent Number: 5,226,678
[45] Date of Patent: * Jul. 13, 1993

[54] SPLIT GLAND

[76] Inventor: Joseph J. Petranto, 1200 Second St., Los Alamos, N. Mex. 87544

[ * ] Notice: The portion of the term of this patent subsequent to Jan. 13, 2009 has been disclaimed.

[21] Appl. No.: 403,113

[22] Filed: Aug. 31, 1989

Related U.S. Application Data

[63] Continuation-in-part of Ser. No. 110,079, Oct. 14, 1987, Pat. No. 4,863,198, which is a continuation of Ser. No. 32,265, Mar. 31, 1987, abandoned, which is a continuation of Ser. No. 836,651, Mar. 5, 1986, abandoned.

[51] Int. Cl.$^5$ .............................................. F16L 35/00
[52] U.S. Cl. .................................. 285/39; 285/334.5; 285/387; 285/356; 285/393; 411/65; 411/433
[58] Field of Search ................ 285/334.5, 387, 356, 285/39, 393, 373, 419, 386, 384, 353; 411/65, 432, 433, 64, 178

[56] References Cited

U.S. PATENT DOCUMENTS

| | | | |
|---|---|---|---|
| 519,568 | 5/1894 | Cooney | 285/356 X |
| 625,448 | 5/1899 | Jaenichen . | |
| 919,913 | 4/1909 | Miller | 285/393 X |
| 1,441,138 | 1/1923 | Westervelt | 285/393 X |
| 3,160,055 | 12/1964 | Devine et al. | 411/65 |
| 3,679,237 | 7/1972 | De Angelis | 285/387 X |
| 3,734,547 | 5/1973 | Kojima | 285/357 |
| 4,132,146 | 1/1979 | Uhlig | 411/433 |
| 4,358,140 | 11/1982 | Jonsson | 285/373 X |
| 4,634,154 | 1/1987 | Arora et al. | 285/387 X |
| 4,657,458 | 4/1987 | Woller | 411/64 X |
| 4,863,198 | 9/1989 | Petranto | 285/334.5 X |

FOREIGN PATENT DOCUMENTS

| | | | |
|---|---|---|---|
| 83419 | 8/1976 | Australia . | |
| 1447083 | 1/1966 | France | 285/334.5 |
| 726374 | 4/1980 | U.S.S.R. . | |
| 0675943 | 7/1952 | United Kingdom | 285/353 |
| 2081407 | 2/1982 | United Kingdom | 285/387 |

OTHER PUBLICATIONS

"Snap-on Fitting Secures Bent Tubing," Machine Design, p. 44, Aug. 1983.

Primary Examiner—Dave W. Arola
Assistant Examiner—Carol I. Bordas
Attorney, Agent, or Firm—James E. Snead

[57] ABSTRACT

A split gland having only three parts to obtain effective stability to relative motion of the constituent half-gland members. A large area clamping ring generates a clamping force effective to maintain the alignment between male and female mirror image half-gland members. Ease of manufacture and use result from the reduction in complexity of the present invention.

3 Claims, 3 Drawing Sheets

SPLIT GLAND

BACKGROUND OF THE INVENTION

This application is a continuation-in-part of U.S. patent application Ser. No. 110,079, filed Oct. 14, 1987, now U.S. Pat. No. 4,863,198, issued Sep. 5, 1990, which is a continuation of U.S. patent application Ser. No. 032,265 filed Mar. 31, 1987, and now abandoned, which is a continuation of U.S. patent application Ser. No. 836,651, filed Mar. 5, 1986, and now abandoned.

The present invention relates generally to glands and more particularly to a split gland which can be laterally installed over a tube instead of having to be slipped over the end thereof. This invention is the result of a contract with the Department of Energy (Contract No. W-7405-ENG-36).

Glands find significant and varied use in industry. For example, gland applications include attaching pneumatic and hydraulic lines in automotive, marine and aircraft systems and the like. Conventional threaded glands must be slipped over the ends of the tubing employed. The tubing is then usually either flared or ferrules disposed near the end of the tubing, and the threaded gland utilized to secure the tubing to appropriate fittings having matching threads.

The tubing is generally preformed or bent to form. Once the tubing is bent a sufficient amount, conventional glands cannot slide over the bend because the inside diameter of the gland must be sufficiently small to hold the tubing in position when the gland is threaded into a fitting. Therefore, conventional glands can only be slid along straight tubing or tubing having gentle bends.

Additionally, the threads of a gland are occasionally stripped during the connection process of the tubing to a fitting, the flats of the gland head become rounded, or the gland may be discovered to be defective after it is in place on the tubing and the flared tubing or the ferrule prevents its direct removal. In these situations, the tubing must be cut in order to remove a conventional gland. Significant effort may be required to replace or reconnect the severed tubing, especially in the situation where the tubing is formed having a series of tight bends and/or the tubing assembly is positioned in a difficult-to-reach location. For these and other reasons known to those skilled in the art of fluid actuated machinery, for example, it is desirable to have a gland which can be laterally slipped over tubing.

Two references are known to the inventor which are relevant to the subject invention. First, U.S. Pat. No. 4,343,496, "Split Gland," issued to Joseph J. Petranto on Aug. 10, 1982, describes a split gland similar in outward appearance to that for the subject invention. The gland disclosed in the patent requires a U-shaped retainer to align the two, substantially mirror-image half glands. This retainer is positioned relative to the other parts of the gland by slots in the half glands, necessitating additional machining steps in the manufacture of the gland, and more complicated assembly and use thereof. It was originally believed by the inventor that a four piece split gland would be required to stabilize the assembled gland in order to enable it to be threaded into a female fitting without cross-threading occurring. The alternative was to employ a very stiff and bulky spring clamp which would render the gland difficult to use for its intended purpose. Subsequent to the filing of the first split gland patent, it was discovered that the embodiments of the present invention described hereinbelow provide the required rigidity of location of the two halves of the split gland without having to resort to an oversized or overstiff spring clamp. A second reference, "Scanning for Ideas," Machine Design, Aug. 11, 1983, page 44, briefly describes a snap-on fitting derived from the invention disclosed in the above-mentioned patent. Although the description states that the two gland halves are notched for alignment and held together by a flat metal spring, there is no disclosed manner in which the two notched surfaces might engage in any way in order to provide some locking or alignment capability. Another piece, which inserts into the notches, must be provided. Such a member is not disclosed in the description of the apparatus. These and other problems are addressed by the present invention and a clamped split gland is provided with only a locking clamp to provide both locking and alignment of the split gland halves.

SUMMARY OF THE INVENTION

Accordingly, it is an object of the subject invention to provide a gland which may be replaced without severing formed, flared or ferruled tubing.

Another object of the subject invention is to provide a gland which may be easily replaced when damaged in situ.

Yet another object of the invention is to provide a gland suitable for mounting on formed tubing disposed in areas having difficulty of access.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus hereof includes a male half-gland member having a semicircular outer portion and two generally flat longitudinally disposed inner portions, with the outer portion having a male threaded portion disposed beginning at one end of the male half-gland member and a wrench-engaging portion disposed at the other end of the male half-gland member, the male half-gland member further having a groove formed in an outer surface. A female half-gland member is a mirror image of the male half-gland member with a semicircular outer portion and two generally flat longitudinally disposed inner portions. The outer portions have a male threaded portion disposed beginning at one end of the female half-gland member and a wrench engaging portion disposed at the other end. The female half-gland member also includes a groove formed in an outer surface. A resilient spring clip, having a circumferential extent greater than 180°, is positioned within the grooves of the male and female half-gland members to clamp the members together. The spring clip has a spring strength and mating area within the grooves to provide stability to maintain alignment of the male threaded portions for screwing into a female fitting while permitting the half-gland members to be resiliently spread apart to enable the split gland to be laterally snapped over a tube.

Benefits and advantages of the subject invention include the fact that malfunctioning or faulty glands can be replaced without having to sever and replace the tubing involved. This is due to the property of the split glands of the present invention which enables them to be reversibly slipped onto tubing and removed laterally from the tubing rather than having to be installed over an end, which would not be possible if the tubing is already preformed or bent, flared or has ferrules crimped onto it. Another advantage of the subject invention is that if the ferrule is locked by either being crimped or brazed onto the tube in the assembled apparatus and the gland was inadvertently not previously placed on the tube, the apparatus need not be discarded. Yet another advantage of the subject invention is that split glands can be slipped over tight bends in tubing.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENTS

Reference will now be made in detail to the present preferred embodiments of the invention, examples of which are illustrated in the accompanying drawings. Similar or identical structure will be denoted by the same call out numbers throughout.

Figure 1:
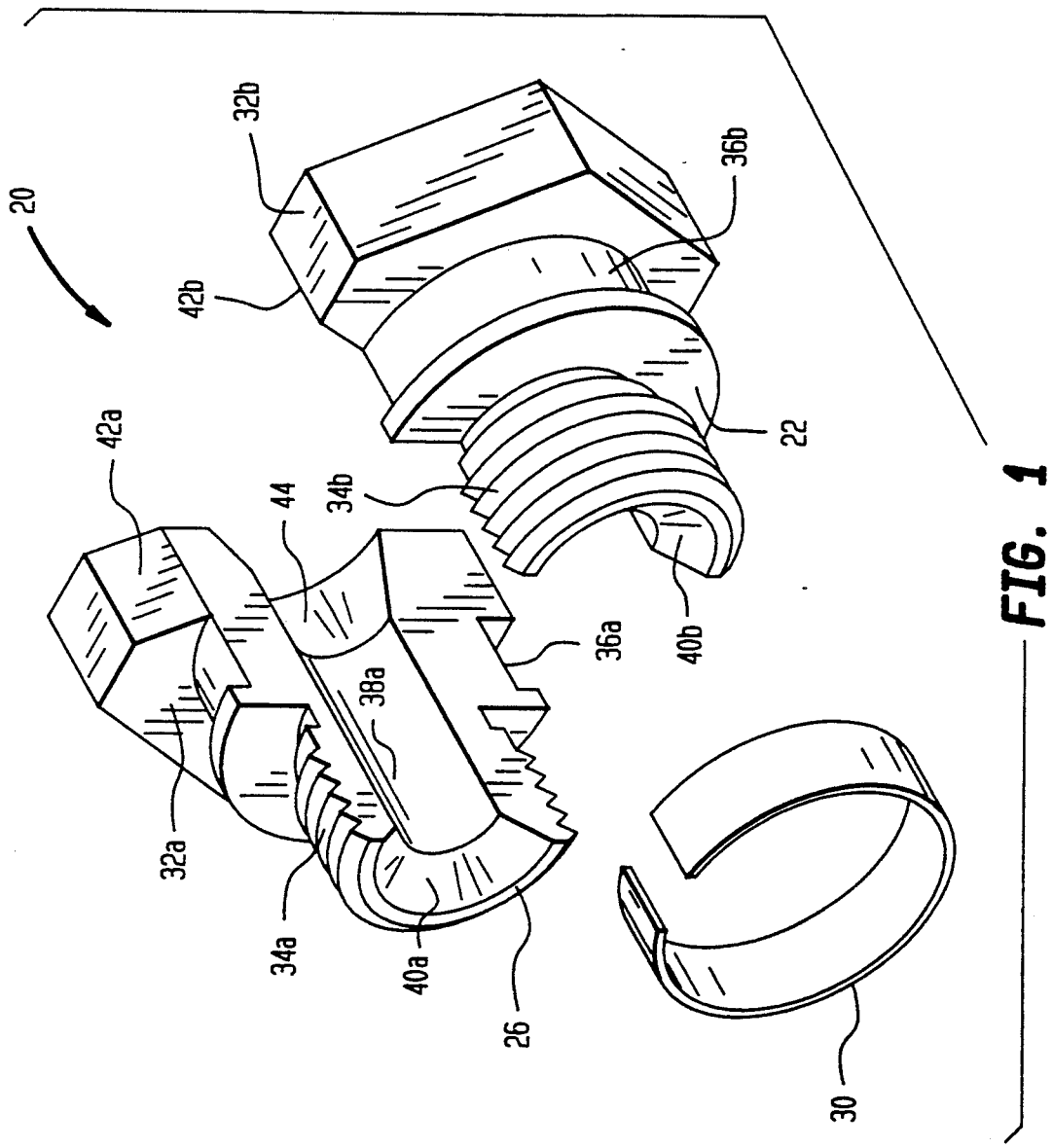
FIG. 1 is an exploded orthographic view of the present invention showing a pair of mirror-image half-gland members each of which has a large spring clip receiving groove for receiving a wide and stiff circular spring clip also shown therein.

Turning now to the drawings, FIG. 1 shows an exploded orthographic view of the first preferred embodiment of the subject split gland 20 showing the male half-gland member 22, mirror image female half-gland member 26, and circular spring clip 30. Circular spring clip 30 is a resilient, open-ended flat spring clip having a circumferential extent greater than 180°. Additional features of the split gland include corresponding wrench-engaging head portions for each half member 32a, b, and corresponding male threaded portions for each half member 34a, b adapted to be received by a female fitting, a corresponding spring groove for each half member 36a, b, a corresponding groove 38a in each half member adapted to receive ferruled or flared tubing, the matching tubing receiving grooves having a countersunk portion at the front end of each of said half members 40a, b adapted to receive one of either a flared or ferruled tubing termination, and a corresponding beveled portion 42a, b on each of the half members to enable the assembled split gland to spread apart when receiving a tube against the action of the circular spring clip 30. As a tube is pushed against an assembled split gland, the tube engages beveled portions 42a, b which in turn facilitates the spreading apart of each half member 22 and 26. A flared portion 44 may be provided in the rear portion of each of the half-gland members in order to permit greater flexibility in the movement of the assembled split gland around bends in the tubing.

Where rigorous stability of the two half-gland members assembled as a gland is not required to overcome problems of cross threading fittings into which the assembled gland of the present invention is to be placed, the two half-gland members 22, 26 are constructed to be mirror images of one another. Circular spring groove 36a, b is made wide in order for it to receive an oversized circular spring clip 30 which is sufficiently stiff and wide to provide an effective stability of the two clamped half-gland members, which have no protrusions with matching indentations on their flat inner surfaces, to prevent cross-threading during insertion within threaded fittings. One of ordinary skill in the mechanical arts can select the width of the circular spring clip 30, its thickness, spring strength, and material of construction to achieve the desired level of stability and reliability of the assembled split gland.

Figure 2:
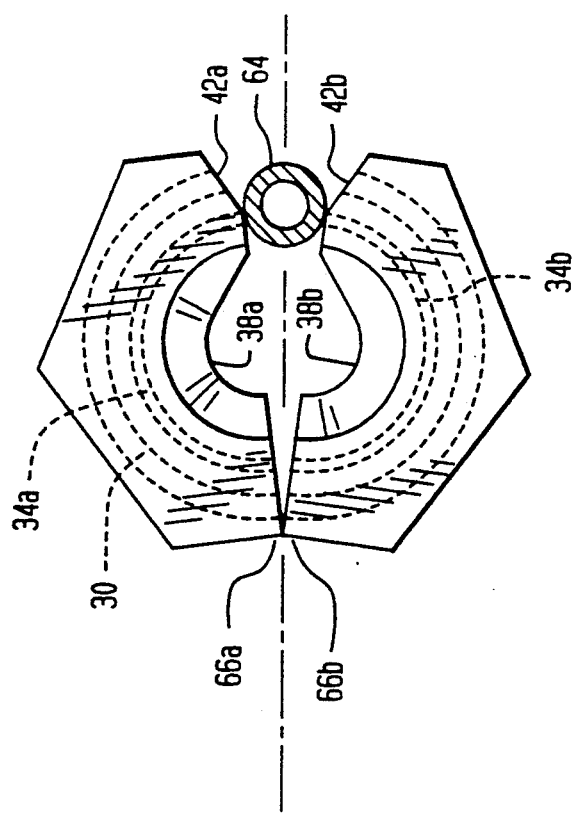
FIG. 2 is a schematic representation of the end view of the split gland for the embodiment of my invention shown in FIG. 1 hereof showing the teardrop-shaped, tube-receiving bore of the assembled split gland, the radiused notch, the tubing starting notch, and the circular spring clip. The assembled split gland is shown being installed laterally over a tube.

FIG. 2 is a cross-sectional representation of the end view of the split gland for the embodiment of the subject invention shown in FIG. 1, showing the teardrop-shaped tube-receiving bore 38a, b for the assembled split gland, the circular spring clip 30, and the tube starting notch 42a, b. The assembled split gland is shown being installed laterally over a tube 64. The tube-receiving bore of the assembled split gland has a cross-sectional configuration which is teardrop in shape in order to facilitate the removal of a tube that has been inserted into the assembled split gland against the action of the spring clip 30. That is, as the tube presses against the smaller side of the tube-receiving bore, the force on the half-gland members, and accordingly spring clip 30, tends to spread them apart. Radius notch 66a, b permits the insertion of a tube commensurate with the size of the tube-receiving bore without causing excessive spreading of the tube half-gland members.

Figure 3:
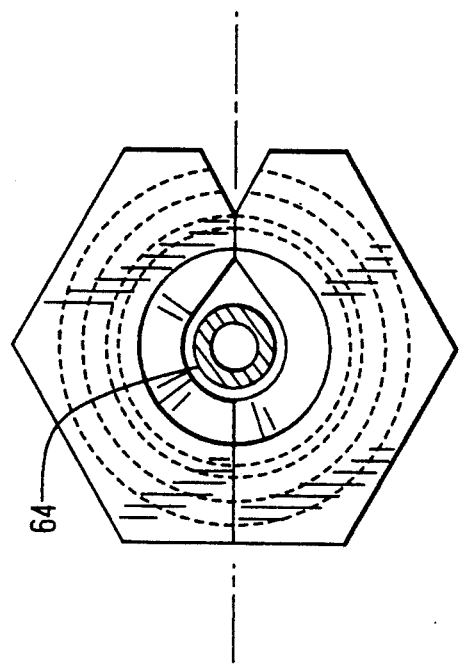
FIG. 3 is a schematic representation of the end view of the split gland described in FIG. 2 hereof after installation around a tube.

FIG. 3 is a cross-sectional representation of the end view of the split gland described in FIG. 2 hereof after having been snapped around a tube 64.

Figure 4:
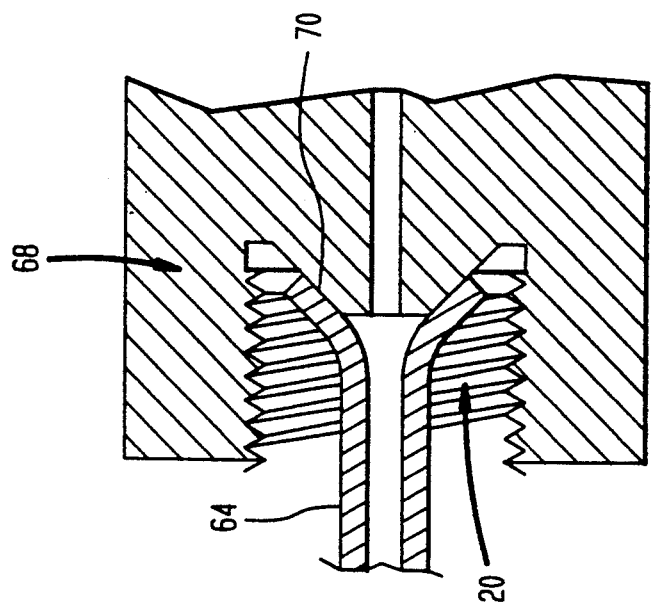
FIG. 4 is a schematic representation of the side view of the split gland for the embodiment of the subject invention shown in FIG. 1 illustrating the split gland being threaded into a fitting which accommodates a tubing having a flared end.

FIG. 4 is a schematic representation of the side view of the split gland for the embodiment of my invention shown in FIG. 1 hereof illustrating the split gland 20 being threaded into a fitting 68 which accommodates a tube 64 having a flared end 70.

Figure 5:
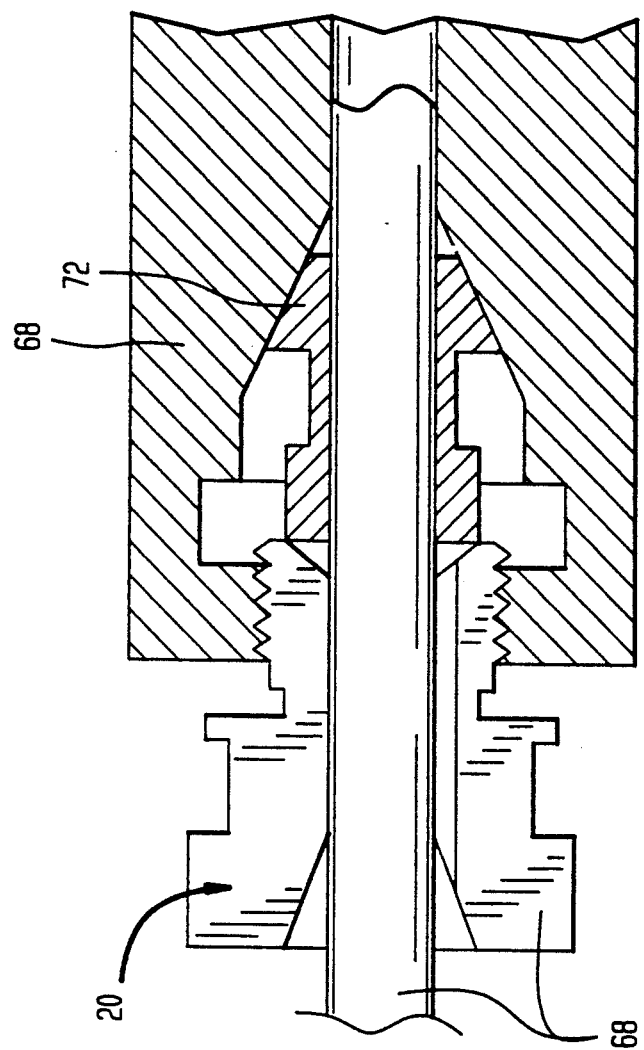
FIG. 5 is a schematic representation of the side view of the split gland for the embodiment of my invention shown in FIG. 1 illustrating the split gland being threaded into a fitting which accommodates a tube having a ferrule thereon.

FIG. 5 is a schematic representation of the side view of the split gland for the embodiment of my invention shown in FIG. 1 hereof illustrating the split gland 20 being threaded into a fitting 68 having a ferrule 72 thereon.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. A split gland consisting of:

a male half-gland member having a semicircular outer portion and two generally flat longitudinally disposed inner portions and a first curved surface therebetween, said outer portion having a male threaded portion disposed beginning at one end of said male half-gland member and a wrench-engaging portion disposed at the other end of said male half-gland member, said male half-gland member further having a groove formed in an outer surface thereof and spaced a distance from the male threaded portion;

a female half-gland member in mirror image of said male half-gland member having a semicircular outer portion and two generally flat longitudinally disposed inner portions and a second curved surface therebetween, said outer portion having a male threaded portion disposed beginning at one end of said female half-gland member and a wrench-engaging portion disposed at the other end of said female half-gland member, said female half-gland member further having a groove formed in an outer surface thereof and spaced a distance from the male threaded portion which is equal to the distance that the groove on the male half-gland member is spaced from the male threaded portion on the male half-gland member;

a resilient spring clip having a circumferential extent greater than 180°, said clip being positioned within said groove of said male and female half-gland members such that the male threaded portion and the groove of the male half-gland member is aligned with the corresponding male threaded portion and groove of the female half-gland member and having a spring strength and mating area within said grooves to provide stability to said male threaded portions effective for screwing into a female fitting while permitting said half-gland members to be resiliently spread apart to enable the split gland to be laterally snapped over a tube.

2. The split gland of claim 1 wherein said first and second curved surfaces define a bore when said spring clip is positioned within said grooves, said bore having a substantially teardrop-shaped cross-sectional configuration to facilitate removal of said tube from the split gland.

3. The split gland of claim 1 wherein said male half-gland member and said female half-gland member each define a beveled surface on one of said two generally flat portions effective for engaging said tube and for facilitating the spreading apart of said half-gland members as the split gland is pushed against said tube.

* * * * *